Patented Nov. 2, 1926.

1,605,754

UNITED STATES PATENT OFFICE.

BENJAMIN H. MERCK, OF GAINESVILLE, GEORGIA.

PROCESS FOR PRODUCING A TABLE SIRUP.

No Drawing.  Application filed July 24, 1926. Serial No. 124,785.

This invention relates to a compound for use as a table sirup and more particularly to the production of a table sirup having a cocoanut flavor.

An important object of the invention is to provide a clear sirup having the appearance and consistency of honey and which will keep for a relatively long time.

In the production of the sirup, I employ the following ingredients:—glucose 20 pounds, sugar 20 pounds, water 4 gallons, cocoanut 8 to ten pounds.

In the preparation of the sirup, the glucose and sugar are placed in an open kettle with one gallon of water and heated to a temperature of 290° F. The cocoanut is then placed in the sirup and allowed to remain from seven to ten minutes. After this period, the balance of the water is added and cooking continued for five minutes. The mixture is then placed in a tank and allowed to stand from nine to twelve hours or a sufficient interval to permit a cocoanut butter, which forms on the top of the mixture, to completely separate, so that it may be skimmed off. After this, the sirup is strained and is ready for use. The prepared sirup is clear, being about the color and consistency of dark honey.

By removal of the cocoanut butter, any tendency of the sirup to become rancid is avoided and at the same time the color of the sirup is made. If left in the sirup, the color of the sirup would be considerably darker and much less attractive and there would furthermore be a tendency of this butter to form a scum on the top of the sirup, causing doubt as to its purity.

I claim:—

The process of producing a cocoanut flavored sirup consisting in boiling together equal parts of sugar and glucose with the addition of a small amount of water, placing cocoanut in the sirup as produced and cooking the same for a short period, adding further water and continuing the cooking, permitting the mixture to stand until the cocoanut butter released by cooking has separated, removing the cocoanut butter and straining from the sirup the cocoanut.

In testimony whereof I hereunto affix my signature.

BENJAMIN H. MERCK.